(No Model.) 2 Sheets—Sheet 1.
F. S. HYDE.
COTTON CHOPPER.
No. 492,867. Patented Mar. 7, 1893.
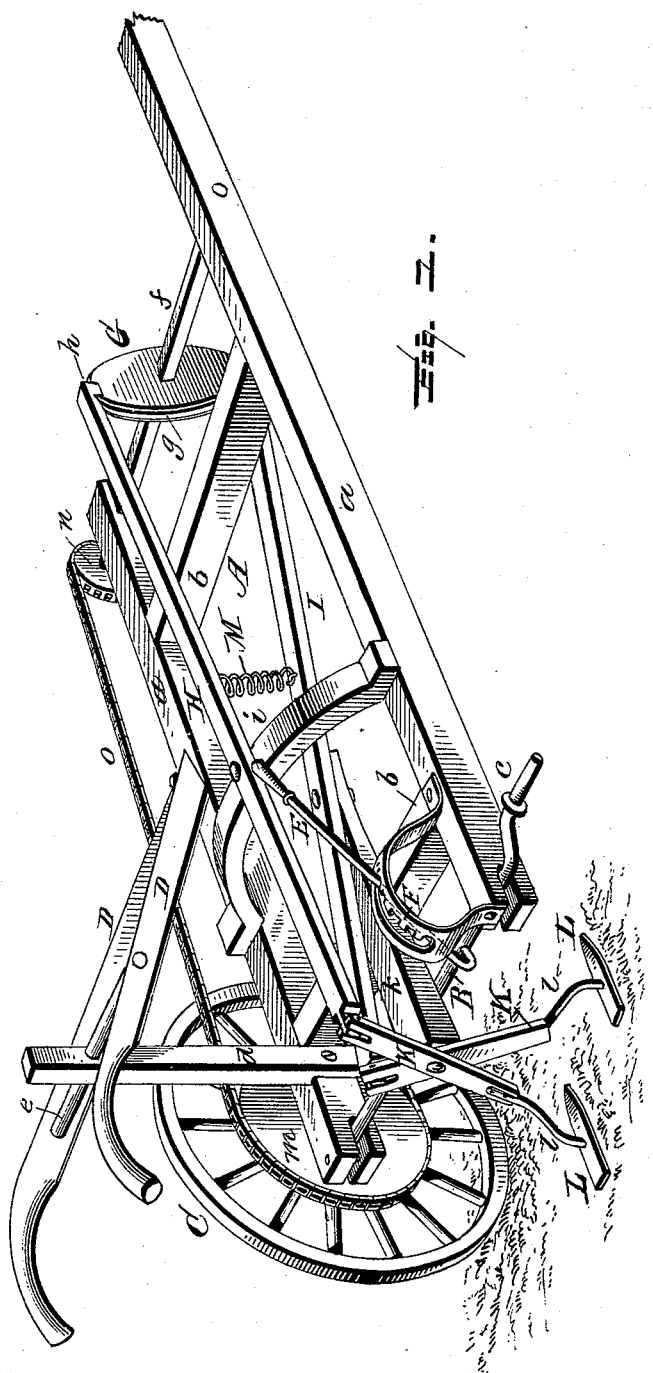
Witnesses
L. C. Hills
D. Y. Wood
Inventor
Frank S. Hyde
per Chas. N. Fowler
Attorney

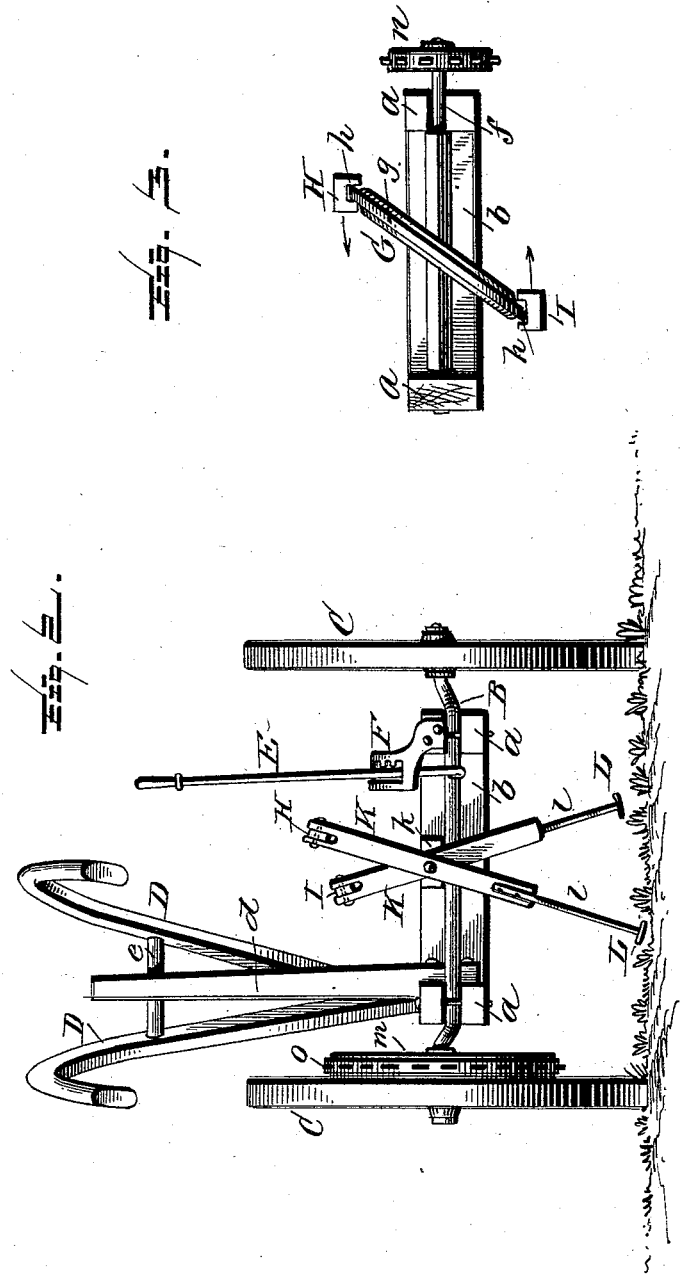

UNITED STATES PATENT OFFICE.

FRANK SULE HYDE, OF SULPHUR SPRINGS, TEXAS.

COTTON-CHOPPER.

SPECIFICATION forming part of Letters Patent No. 492,867, dated March 7, 1893.

Application filed December 29, 1892. Serial No. 456,727. (No model.)

*To all whom it may concern:*

Be it known that I, FRANK SULE HYDE, a citizen of the United States, residing at Sulphur Springs, in the county of Hopkins and State of Texas, have invented certain new and useful Improvements in Cotton-Choppers; and I do hereby declare that the following is a full, clear, and exact description of the same, reference being had to the annexed drawings, making a part of this specification, and to the letters of reference marked thereon.

The present invention has relation to that class of agricultural implements or machines which are drawn over a drilled row of cotton plants to chop gaps in the row whereby the plants are left in bunches or hills, and the object of the invention is to provide simple and effective means for operating the cutters that will give thereto the required vibratory or reciprocating motion through the medium of rotary motion, thereby materially improving the machine and enhancing its value to the agriculturist.

The invention therefore consists in the construction substantially as shown in the drawings and hereinafter described and claimed.

Figure 1 of the drawings is a perspective view of my improved cotton-chopper with one of the wheels removed to better show the construction thereof. Fig. 2, a rear end view of the cotton chopper. Fig. 3, a detail view partly in section showing the devices used to impart to the cutters a reciprocating motion through the medium of a rotary motion.

In the accompanying drawings A represents the frame of the machine of any preferred and well known construction, which consists in the present instance of longitudinal beams $a$ and transverse beams $b$ connected thereto. The rear ends of the beams $a$ have open slots to form bearings for the axle B which has crank ends $c$ upon which are loosely mounted suitable wheels C.

To one of the beams $a$ is connected an upright $d$ and to this upright are connected, through the medium of the transverse brace $e$, suitable handles D, which handles are also connected to the beam.

Connected to the axle B is a lever E which passes up through a slotted toothed plate F, thereby enabling the wheels to be raised or lowered by turning the crank-axle to which they are connected, and holding the wheels in their adjusted position by engaging the lever with the teeth on the plate.

So far as I have described the several parts of the machine, the same can be changed or modified as found preferable, and I do not therefore wish to be understood as confining myself to the construction shown, as any changes can be made in the details of construction which come within ordinary mechanical skill, and without departing from the principle of my invention. A rotary shaft $f$ has bearings in the forward ends of the beams $a$ and upon this shaft is keyed or otherwise rigidly connected an eccentric disk G which has around its periphery a guide flange $g$ to receive the grooved ends $h$ of arms H I. The arms are pivoted respectively to the transverse brace $i$ and the central support $k$ which are connected to the frame of the machine in any desirable manner.

To the rear end of the support $k$ are pivoted the arms K which cross each other as shown, and to the lower ends of these arms are connected the shanks $l$ to which are secured the usual cutters L. The upper ends of the arms K are hinged or pivoted to the rear ends of the arms H I and thus make a connection between the cutter-arms and the eccentric whereby a reciprocating motion is imparted to the cutters by the action of the eccentric when the latter rotates.

To the inner side of one of the wheels C is connected a sprocket wheel $m$ and upon one end of the shaft $f$ is a similar but smaller wheel $n$ and over these wheels passes an endless sprocket chain $o$, thereby giving motion to the shaft when the wheel revolves. Any suitable and well known means may be employed to rotate the shaft $f$ and therefore I do not wish to be confined to the means shown.

Between the arms H I is located a suitable spring M to keep the grooved ends of the arms in engagement with the guide flange on the eccentric disk G. The smaller sprocket wheel is preferably removable from the shaft so that it can be replaced by one of different diameter to decrease or diminish the speed or motion of the cutters. As will be noticed, the eccentric G is not only elliptical in shape but connected to the shaft at an angle from a perpendicular or in other words at an acute angle to the axis of the shaft to which it is connected. The form of eccentric and the manner of connecting it to the shaft provides a very simple and effective means for imparting to the cutters a reciprocating motion through the medium of a rotary motion and an intermediate connection between the eccentric disk and cutters.

The spring M serves a very important function in perfectly keeping the grooved ends of the arms in connection with the guide-flange of the disk, thereby insuring a horizontal reciprocating motion of arms which imparts to the arms carrying the cutters a reciprocating motion in the arc of a circle.

Having now fully described my invention, what I claim as new, and desire to secure by Letters Patent, is—

In a cotton-chopper, the combination of pivoted arms carrying suitable cutters, arms pivoted to the frame of the machine and also to the upper ends of the cutter-arms, grooves upon the forward ends of the main-arms, a spring located between the same, and an eccentric disk connected to a rotary shaft and having a guide-flange upon its periphery to engage with the groove upon the ends of the main-arms, substantially as and for the purpose described.

In testimony that I claim the above I have hereunto subscribed my name in the presence of two witnesses.

FRANK SULE HYDE.

Witnesses:
JAMES B. HYDE,
E. R. McKINNEY.